UNITED STATES PATENT OFFICE.

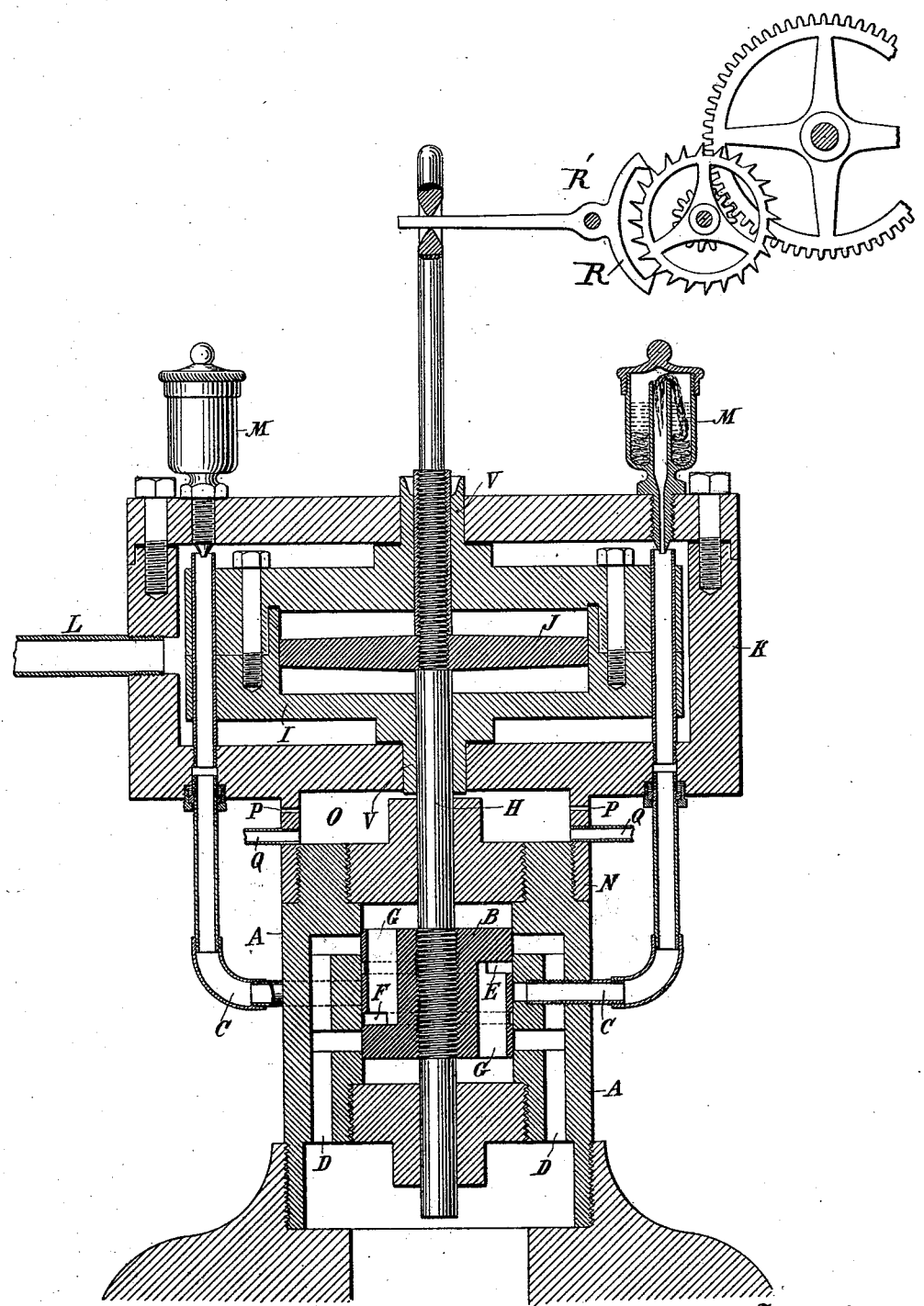

NIKOLA TESLA, OF NEW YORK, N. Y.

RECIPROCATING ENGINE.

SPECIFICATION forming part of Letters Patent No. 514,169, dated February 6, 1894.

Application filed August 19, 1893. Serial No. 483,563. (No model.)

*To all whom it may concern:*

Be it known that I, NIKOLA TESLA, a citizen of the United States, residing at New York, in the county and State of New York, have invented certain new and useful Improvements in Reciprocating Engines, of which the following is a specification, reference being had to the drawing accompanying and forming a part of the same.

In the invention which forms the subject of my present application, my object has been, primarily to provide an engine, which under the influence of an applied force such as the elastic tension of steam or gas under pressure will yield an oscillatory movement which, within very wide limits, will be of constant period, irrespective of variations of load, frictional losses and other factors which in all ordinary engines produce change in the rate of reciprocation.

The further objects of the invention are to provide a mechanism, capable of converting the energy of steam or gas under pressure into mechanical power more economically than the forms of engine heretofore used, chiefly by overcoming the losses which result in these by the combination with rotating parts possessing great inertia of a reciprocating system; which also, is better adapted for use at higher temperatures and pressures, and which is capable of useful and practical application to general industrial purposes, particularly in small units.

The invention is based upon certain well known mechanical principles a statement of which will assist in a better understanding of the nature and purposes of the objects sought and results obtained. Heretofore, where the pressure of steam or any gas has been utilized and applied for the production of mechanical motion it has been customary to connect with the reciprocating or moving parts of the engine a fly-wheel or some rotary system equivalent in its effect and possessing relatively great mechanical inertia, upon which dependence was mainly placed for the maintenance of constant speed. This, while securing in a measure this object, renders impossible the attainment of the result at which I have arrived, and is attended by disadvantages which by my invention are entirely obviated. On the other hand, in certain cases, where reciprocating engines or tools have been used without a rotating system of great inertia, no attempt, so far as I know, has been made to secure conditions which would necessarily yield such results as I have reached.

It is a well known principle that if a spring possessing a sensible inertia be brought under tension, as by being stretched, and then freed it will perform vibrations which are isochronous and, as to period, in the main dependent upon the rigidity of the spring, and its own inertia or that of the system of which it may form an immediate part. This is known to be true in all cases where the force which tends to bring the spring or movable system into a given position is proportionate to the displacement.

In carrying out my invention and for securing the objects in general terms stated above, I employ the energy of steam or gas under pressure, acting through proper mechanism, to maintain in oscillation a piston, and, taking advantage of the law above stated, I connect with said piston, or cause to act upon it, a spring, under such conditions as to automatically regulate the period of the vibration, so that the alternate impulses of the power impelled piston, and the natural vibrations of the spring shall always correspond in direction and coincide in time.

While, in the practice of the invention I may employ any kind of spring or elastic body of which the law or principle of operation above defined holds true, I prefer to use an air spring, or generally speaking a confined body or cushion of an elastic fluid, as the mechanical difficulties in the use of ordinary or metallic springs are serious, owing mainly, to their tendency to break. Moreover, instead of permitting the piston to impinge directly upon such cushions within its own cylinder, I prefer, in order to avoid the influence of the varying pressure of the steam or gas that acts upon the piston and which might disturb the relations necessary for the maintenance of isochronous vibration, and also to better utilize the heat generated by the compression, to employ an independent plunger connected with the main piston, and a chamber or cylinder therefor, containing air which is normally, at the same pressure as the external atmosphere, for thus a spring of practically constant rigidity is obtained, but the air or gas within the cylinder may be maintained at any pressure.

In order to describe the best manner of which I am aware in which the invention is or may be carried into effect, I refer now to the accompanying drawing which represents in central cross-section an engine embodying my improvements.

A is the main cylinder in which works a piston B. Inlet ports C C pass through the sides of the cylinder, opening at the middle portion thereof and on opposite sides. Exhaust ports D D extend through the walls of the cylinder and are formed with branches that open into the interior of the cylinder on each side of the inlet ports and on opposite sides of the cylinder.

The piston B is formed with two circumferential grooves E F, which communicate through openings G in the piston with the cylinder on opposite sides of said piston respectively.

I do not consider as of special importance the particular construction and arrangement of the cylinder, the piston and the ports for controlling it, except that it is desirable that all the ports, and more especially, the exhaust ports should be made very much larger than is usually the case, so that no force due to the action of the steam or compressed air will tend to retard or affect the return of the piston in either direction.

The piston B is secured to a piston rod H, which works in suitable stuffing boxes in the heads of the cylinder A. This rod is prolonged on one side and extends through bearings V in a cylinder I suitably mounted or supported in line with the first, and within which is a disk or plunger J carried by the rod H.

The cylinder I is without ports of any kind and is air-tight except as a small leakage may occur through the bearings V, which experience has shown need not be fitted with any very considerable accuracy. The cylinder I is surrounded by a jacket K which leaves an open space or chamber around it. The bearings V in the cylinder I, extend through the jacket K to the outside air and the chamber between the cylinder and jacket is made steam or air tight as by suitable packing. The main supply pipe L for steam or compressed air leads into this chamber, and the two pipes that lead to the cylinder A run from the said chamber, oil cups M being conveniently arranged to deliver oil into the said pipes for lubricating the piston.

In the particular form of engine shown, the jacket K which contains the cylinder I is provided with a flange N by which it is screwed to the end of the cylinder A. A small chamber O is thus formed which has air vents P in its sides and drip pipes Q leading out from it through which the oil which collects in it is carried off.

To explain now the operation of the device above described. In the position of the parts shown, or when the piston is at the middle point of its stroke, the plunger J is at the center of the cylinder I and the air on both sides of the same is at the normal pressure of the outside atmosphere. If a source of steam or compressed air be then connected to the inlet ports C C of the cylinder A and a movement be imparted to the piston as by a sudden blow, the latter is caused to reciprocate in a manner well understood. The movement of the piston in either direction ceases when the force tending to impel it and the momentum which it has acquired are counterbalanced by the increasing pressure of the steam or compressed air in that end of the cylinder toward which it is moving and as in its movement the piston has shut off at a given point, the pressure that impelled it and established the pressure that tends to return it, it is then impelled in the opposite direction, and this action is continued as long as the requisite pressure is applied. The movements of the piston compress and rarify the air in the cylinder I at opposite ends of the same alternately. A forward stroke compresses the air ahead of the plunger J which acts as a spring to return it. Similarly on the back stroke the air is compressed on the opposite side of the plunger J and tends to drive it forward. This action of the plunger upon the air contained in the opposite ends of the cylinder is exactly the same in principle as though the piston rod were connected to the middle point of a coiled spring, the ends of which are connected to fixed supports. Consequently the two chambers may be considered as a single spring. The compressions of the air in the cylinder I and the consequent loss of energy due mainly to the imperfect elasticity of the air, give rise to a very considerable amount of heat. This heat I utilize by conducting the steam or compressed air to the engine cylinder through the chamber formed by the jacket surrounding the air-spring cylinder. The heat thus taken up and used to raise the temperature of the steam or air acting upon the piston is availed of to increase the efficiency of the engine. In any given engine of this kind the normal pressure will produce a stroke of determined length, and this will be increased or diminished according to the increase of pressure above or the reduction of pressure below the normal.

In constructing the apparatus I allow for a variation in the length of stroke by giving to the confining cylinder I of the air spring properly determined dimensions. The greater the pressure upon the piston, the higher will be the degree of compression of the air-spring, and the consequent counteracting force upon the plunger. The rate or period of reciprocation of the piston however is no more dependent upon the pressure applied to drive it, than would be the period of oscillation of a pendulum permanently maintained in vibration, upon the force which periodically impels it, the effect of variations in such force being merely to produce corresponding variations in the length of stroke or amplitude of vibration respectively. The period is mainly determined by the rigidity of the air spring and the inertia of the moving system, and I may therefore secure any period of oscillation within very wide limits by properly portioning these factors, as by varying the dimensions of the air chamber which is equivalent to varying the rigidity of the spring, or by adjusting the weight of the moving parts. These conditions are all readily determinable, and an engine constructed as herein described may be made to follow the principle of operation above stated and maintain a perfectly uniform period through very much wider limits of pressure than in ordinary use, it is ever likely to be subjected to and it may be successfully used as a prime mover wherever a constant rate of oscillation or speed is required, provided the limits within which the forces tending to bring the moving system to a given position are proportionate to the displacements, are not materially exceeded. The pressure of the air confined in the cylinder when the plunger J is in its central position will always be practically that of the surrounding atmosphere, for while the cylinder is so constructed as not to permit such sudden escape of air as to sensibly impair or modify the action of the air spring there will still be a slow leakage of air into or out of it around the piston rod according to the pressure therein, so that the pressure of the air on opposite sides of the plunger will always tend to remain at that of the outside atmosphere.

As an instance of the uses to which this engine may be applied I have shown its piston rod connected with a pawl R the oscillation of which drives a train of wheels. These may constitute the train of a clock or of any other mechanism. The pawl R is pivoted at R' and its bifurcated end engages with the teeth of the ratchet wheel alternately on opposite sides of the same, one end of the pawl at each half oscillation acting to propel the wheel forward through the space of one tooth when it is engaged and locked by the other end on the last half of the oscillation which brings the first end into position to engage with another tooth.

Another application of the invention is to move a conductor in a magnetic field for generating electric currents, and in these and similar uses it is obvious that the characteristics of the engine render it especially adapted for use in small sizes or units.

Having now described my invention, what I claim is—

1. A reciprocating engine comprising in combination, a cylinder, a piston and a spring connected with or acting upon the reciprocating element, the said spring and reciprocating element being related in substantially the manner described so that the forces which tend to bring the reciprocating parts into a given position are proportionate to the displacements, whereby an isochronous vibration is obtained.

2. A reciprocating engine comprising in combination, a cylinder, a piston impelled by steam or gas under pressure, and an air spring maintained in vibration by the movements of the piston, the piston and spring being related in substantially the manner described so that the forces which tend to bring the reciprocating parts into a given position are proportionate to the displacements whereby an isochronous vibration is obtained.

3. The combination of a cylinder and a piston adapted to be reciprocated by steam or gas under pressure, a cylinder and a plunger therein reciprocated by the piston and constituting an air spring acting upon said piston, the piston and spring being related in the manner described so that the forces which tend to bring the piston into a given position are proportionate to the displacement whereby an isochronous oscillation of the piston is obtained.

4. The combination of a cylinder and a piston adapted to be reciprocated by steam or gas under pressure, a cylinder and piston constituting an air spring connected with the piston, a jacket forming a chamber around the air spring through which the steam or compressed gas is passed on its way to the cylinder, as and for the purpose set forth.

5. The method of producing isochronous movement herein described, which consists in reciprocating a piston by steam or gas under pressure and controlling the rate or period of reciprocation by the vibration of a spring, as set forth.

6. The method of operating a reciprocating engine which consists in reciprocating a piston, maintaining by the movements of the piston, the vibration of an air spring and applying the heat generated by the compression of the spring to the steam or gas driving the piston.

NIKOLA TESLA.

Witnesses:
PARKER W. PAGE,
R. F. GAYLORD.